（12） United States Patent
Prostko et al.

(10) Patent No.: US 11,961,347 B2
(45) Date of Patent: *Apr. 16, 2024

(54) SEAMLESS ACCESS CONTROL

(71) Applicant: Schlage Lock Company LLC, Carmel, IN (US)

(72) Inventors: Robert Prostko, Carmel, IN (US); Robert Martens, Carmel, IN (US); Ryan C. Kincaid, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,787

(22) Filed: Jan. 24, 2023

(65) Prior Publication Data

US 2023/0351826 A1 Nov. 2, 2023

Related U.S. Application Data

(63) Continuation of application No. 16/699,350, filed on Nov. 29, 2019, now Pat. No. 11,562,609.

(Continued)

(51) Int. Cl.
*G07C 9/00* (2020.01)
*G01S 13/06* (2006.01)

(52) U.S. Cl.
CPC ..... *G07C 9/00563* (2013.01); *G07C 9/00309* (2013.01); *G07C 9/00896* (2013.01); *G01S 13/06* (2013.01); *G07C 2009/00642* (2013.01)

(58) Field of Classification Search
CPC .......... G07C 9/00563; G07C 9/00309; G07C 9/00896; G07C 2009/00642; G01S 13/06
See application file for complete search history.

(56) References Cited

U.S. PATENT DOCUMENTS 6,720,861 B1 4/2004 Rodenbeck et al.
8,319,605 B2 11/2012 Hassan et al.
(Continued)

FOREIGN PATENT DOCUMENTS

CN 102906360 A 1/2013
CN 107945316 A 4/2018
(Continued)

OTHER PUBLICATIONS

Australian Examination Report; Australian Patent Office; Australian Patent Application No. 2019387477; dated Feb. 23, 2023; 3 pages.
Chinese Office Action; National Intellectual Property Administration; People's Republic of China; Chinese Patent Application No. 201980090470.2; dated Feb. 25, 2023; 9 pages.
(Continued)

*Primary Examiner* — Nader Bolourchi
(74) *Attorney, Agent, or Firm* — Taft Stettinius & Hollister LLP

(57) ABSTRACT

A method for seamless access control according to one embodiment includes determining whether a user is authorized to access a passageway controlled by an access control device based on credential data received from a mobile device of the user, determining, by a RADAR system, a location of the user relative to the passageway, determining whether the user intends to access the passageway based on the determined location of the user relative to the passageway, and controlling, by the access control device, a lock mechanism to allow the user access to the passageway in response to determining that the user is authorized to access the passageway and the user intends to access the passageway.

20 Claims, 6 Drawing Sheets

Related U.S. Application Data

(60) Provisional application No. 62/772,324, filed on Nov. 28, 2018.

(56) References Cited

U.S. PATENT DOCUMENTS

| | | | |
|---|---|---|---|
| 9,196,104 | B2 | 11/2015 | Dumas et al. |
| 9,218,696 | B2 | 12/2015 | Dumas et al. |
| 9,336,637 | B2 | 5/2016 | Neil et al. |
| 9,378,598 | B2 | 6/2016 | Dumas et al. |
| 9,512,643 | B1 | 12/2016 | Keefe |
| 9,970,229 | B1 | 5/2018 | Favila et al. |
| 10,453,281 | B1 | 10/2019 | Lopez et al. |
| 10,619,380 | B2 | 4/2020 | Ahearn et al. |
| 10,719,999 | B2 | 7/2020 | Love et al. |
| 10,759,389 | B2 | 9/2020 | Ledvina et al. |
| 10,760,332 | B2 | 9/2020 | Kincaid et al. |
| 11,562,609 | B2 | 1/2023 | Prostko et al. |
| 11,663,864 | B2 | 5/2023 | Kincaid et al. |
| 2002/0067259 | A1 | 6/2002 | Fufidio et al. |
| 2005/0046546 | A1 | 3/2005 | Masudava |
| 2006/0164208 | A1 | 7/2006 | Schaffzin et al. |
| 2009/0002246 | A1 | 1/2009 | Rabinovich et al. |
| 2010/0201482 | A1 | 8/2010 | Robertson et al. |
| 2012/0032850 | A1 | 2/2012 | Nakagawa et al. |
| 2012/0234058 | A1 | 9/2012 | Neil et al. |
| 2013/0176107 | A1 | 7/2013 | Dumas et al. |
| 2013/0237193 | A1 | 9/2013 | Dumas et al. |
| 2013/0241694 | A1 | 9/2013 | Sharma et al. |
| 2014/0148196 | A1 | 5/2014 | Bassan-Eskenazi et al. |
| 2014/0292481 | A1 | 10/2014 | Dumas et al. |
| 2015/0121465 | A1 | 4/2015 | Berns et al. |
| 2015/0213663 | A1 | 7/2015 | Dumas et al. |
| 2015/0309487 | A1 | 10/2015 | Lyman |
| 2016/0055692 | A1 | 2/2016 | Trani |
| 2016/0086400 | A1 | 3/2016 | Dumas et al. |
| 2016/0180620 | A1 | 6/2016 | Eyring et al. |
| 2016/0189453 | A1 | 6/2016 | Johnson et al. |
| 2016/0217638 | A1 | 7/2016 | Child et al. |
| 2016/0227362 | A1 | 8/2016 | Howard et al. |
| 2016/0307385 | A1 | 10/2016 | Arfwedson et al. |
| 2016/0332598 | A1 | 11/2016 | Ghabra et al. |
| 2016/0337863 | A1 | 11/2016 | Robinson et al. |
| 2016/0350992 | A1 | 12/2016 | Telljohann et al. |
| 2017/0303090 | A1 | 10/2017 | Stitt et al. |
| 2017/0323093 | A1 | 11/2017 | Liu et al. |
| 2017/0372542 | A1 | 12/2017 | Romero et al. |
| 2018/0052217 | A1 | 2/2018 | Jonsson |
| 2018/0056939 | A1 | 3/2018 | Van Roermund et al. |
| 2018/0102008 | A1 | 4/2018 | Dupart et al. |
| 2018/0162321 | A1 | 6/2018 | Spiess |
| 2018/0242105 | A1 | 8/2018 | Sute |
| 2018/0315262 | A1 | 11/2018 | Love et al. |
| 2020/0168017 | A1 | 5/2020 | Prostko et al. |
| 2020/0314651 | A1 | 10/2020 | Pirch et al. |
| 2021/0158637 | A1 | 5/2021 | Kincaid et al. |
| 2023/0010267 | A1 | 1/2023 | Kincaid et al. |
| 2023/0213637 | A1 | 7/2023 | Brown et al. |

FOREIGN PATENT DOCUMENTS

| | | | |
|---|---|---|---|
| EP | 2930071 | A1 | 10/2015 |
| WO | 2014155255 | A1 | 10/2014 |
| WO | 2016177666 | A1 | 11/2016 |
| WO | 2017180563 | A1 | 10/2017 |
| WO | 2017180688 | A1 | 10/2017 |
| WO | 2018071671 | A2 | 4/2018 |
| WO | 2020083750 | A1 | 4/2020 |
| WO | 2020193566 | A1 | 10/2020 |

OTHER PUBLICATIONS

Shikiar, A. et al., The Future of Authentication for the Internet of Things, FIDO Alliance, Mar. 28, 2017, https://fidoalliance.org/wpcontenVuploads/The_Future_of_Authentication_for_IoT_Webinar_170328_v10.pdf, 56 pages.

Developing Beacons with Bluetooth Low Energy (BLE) Technology; Silicon Laboratories; http://www.silabs.com/products/wireless/bluetooth/developing-beacons-with-bluetooth-low-energy-ble-technology; (last visited Apr. 27, 2017).

Angle of arrival; Wikipedia; https://en.wikipedia.org/wiki/Angle_of_arrival; (last visited Apr. 27, 2017).

What do you want to track? Whatever you want to track, Quuppa brings you the dot on the map .; Quuppa—Do More With Location; http://quuppa.com/; (last visited Apr. 27, 2017).

Indoor Location Positioning Technology: Research, Solutions & Trends; Grizzly Analytics; http://www.grizzlyanalytics.com/report_2015_02_indoor.html; (last visited Apr. 27, 2017).

Front Page—Car Connectivity Consortium; Car Connectivity Consortium; retrieved on Jan. 13, 2021; https://carconnectivity.org/; 6 pages.

Volkswagen and NXP Show First Car Using UWB to Combat Relay Theft; EE Times; retrieved on Jan. 13, 2021; https://www.eetimes.com/volkswagen-and-nxp-show-first-car-using-uwb-to-combat-relay-theft/; 4 pages.

Car thefts up 49% in five years following advent of keyless-entry technology; The Sunday Times Driving; retrieved on Jan. 13, 2021; https://www.driving.co.uk/news/many-cars-sale-today-risk-keyless-theft-new-research-finds/; 6 pages.

Front Page—UWB Alliance; UWB Alliance; retrieved on Jan. 13, 2021; https://uwballiance.org/; 11 pages.

Alliance Rallies UWB for Location Services; EE Times; retrieved on Jan. 13, 2021; https://www.eetimes.com/alliance-rallies-uwb-for-location-services/; 2 pages.

UWB Alliance to focus on interoperability, further boosting the UWB ecosystem; FierceWireless; retrieved on Jan. 13, 2021; https://www.fiercewireless.com/wireless/uwb-alliance-to-focus-interoperability-further-boosting-uwb-ecosystem; 4 pages.

Front Page—FiRa Consortium; FiRa Consortium; retrieved on Jan. 13, 2021; https://www.firaconsortium.org/; 3 pages.

Introduction to the FiRa Consortium; FiRa Consortium; Aug. 1, 2019; 17 pages.

Ultra-Wideband (UWB) Gains Traction as a Sensing Technology Under New Industry Consortium; Forbes; retrieved on Jan. 13, 2021; https://www.forbes.com/...01/ultra-wideband-uwb-gains-traction-as-a-sensing-technology-under-new-industry-consortium/?sh=62102d366e21; 6 pages.

The Biggest iPhone News Is a Tiny New Chip Inside It; Wired; retrieved on Jan. 13, 2021; https://www.wired.com/story/apple-u1-chip/; 5 pages.

Apple built UWB into the iPhone 11. Here's what you need to know (FAQ); cnet; retrieved on Jan. 13, 2021; https://www.cnet.com/news/apple-built-uwb-into-the-iphone-11-heres-what-you-need-to-know-faq/; 6 pages.

Ultra-Wideband (UWB); NXP; retrieved on Jan. 13, 2021; https://www.nxp.com/applications/enabling-technologies/connectivity/ultra-wideband-uwb:UWB; 7 pages.

NXP Introduces Higher Security Using Ultra-Wideband Technology; Forbes; https://www.forbes.com/sites/tiriasresearch/2019/06/26/nxp-introduces-higher-security-using-ultra-wideband-technology/?sh=dc7565238410retrieved on Jan. 13, 2021; 5 pages.

Front Page—Decawave; Decawave; retrieved on Jan. 13, 2021; https://www.decawave.com/; 5 pages.

Canadian Examination Report, Canadian Intellectual Property Office, Canadian Patent Application No. 3,127,042, Nov. 6, 2023, 4 pages.

SEAMLESS ACCESS CONTROL

CROSS-REFERENCE TO RELATED APPLICATIONS

This application is a continuation of U.S. application Ser. No. 16/699,350 filed Nov. 29, 2019 and issued as U.S. Pat. No. 11,562,609, which claims the benefit of U.S. Provisional Application No. 62/772,324 filed on Nov. 28, 2018, the contents of each application incorporated herein by reference in their entirety.

BACKGROUND

Access control systems typically involve the use of credentials to manage the operation of an access control device (e.g., a lock device). Such credentials may be assigned to a particular user or device and are often physical in nature, forming at least a portion of, for example, a smartcard, proximity card, key fob, token device, or mobile device. Thus, current credential systems generally require an interaction between the credential and a reader device (e.g., on or secured to the access control device) such that the reader device may read the credential and determine whether access should be granted. In particular, a user may be required to swipe, tap, or otherwise present the credential to the reader device. As such, access control systems typically require an active physical action on behalf of the user in order to grant the user access via the access control device.

SUMMARY

One embodiment is a unique system, components, and methods for seamless access control. Other embodiments include apparatuses, systems, devices, hardware, methods, and combinations for seamless access control. This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
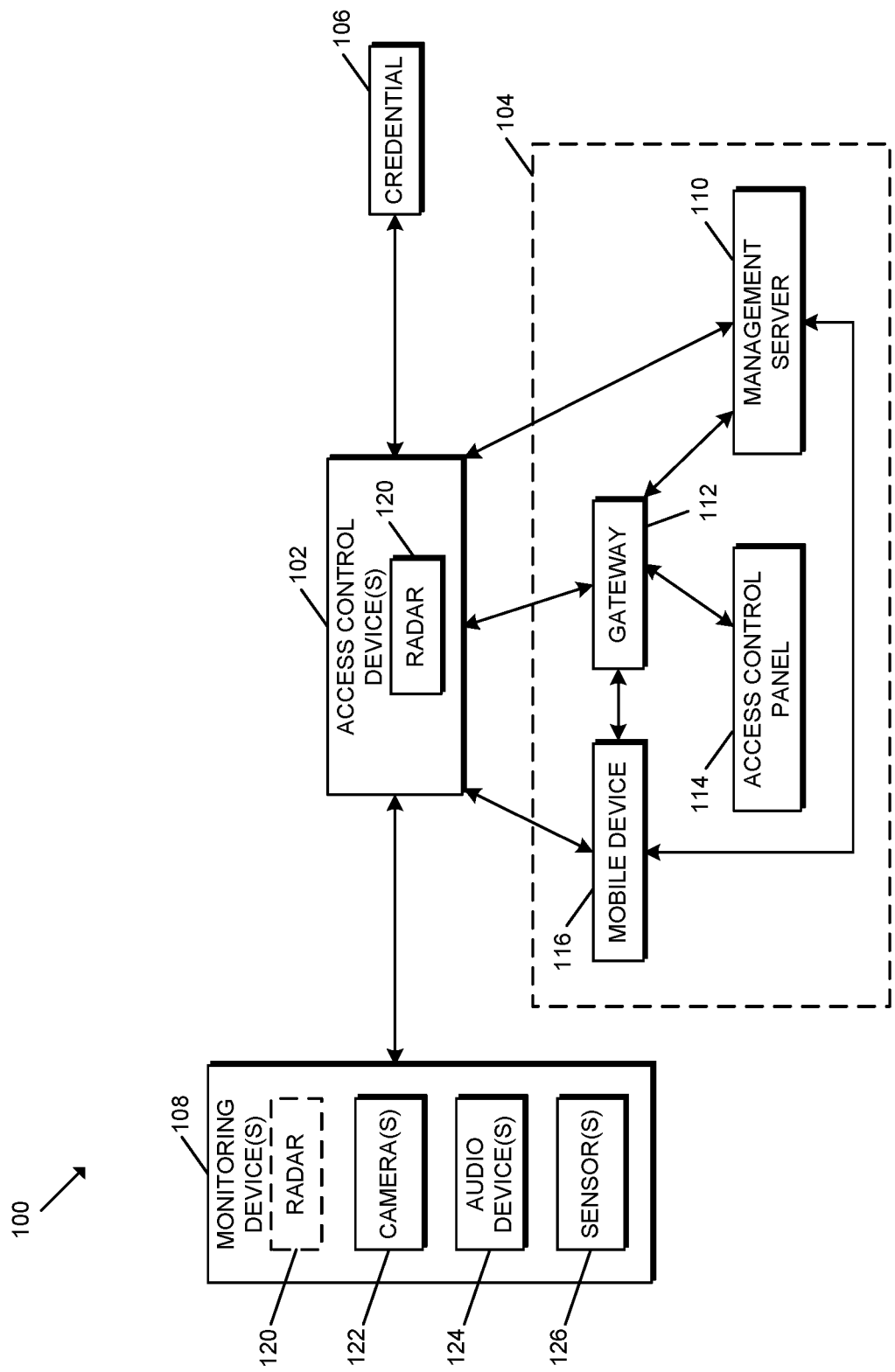
FIG. 1 is a simplified block diagram of at least one embodiment of an access control system for seamless access control.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, an access control system 100 includes one or more access control devices 102, a management system 104, and a credential device 106. Additionally, in some embodiments, the access control system 100 may include one or more monitoring devices 108. Further, the management system 104 may include a management server 110, a gateway device, 112, an access control panel 114, and/or a mobile device 116.

As described in detail below, in the illustrative embodiment, the access control system 100 may be configured to perform multifactor authentication of a user that desires (or potentially desires) access through a passageway secured by the access control device(s) 102 and determine whether the user is authorized to be granted access through the passageway based on the authentication. For example, the access control system 100 may perform authentication based on one or more features in the user's possession (e.g., a physical and/or virtual credential 106), based on one or more features of the user (e.g., biometrics), based on one or more features known to the user (e.g., historical information, PIN, passcode, etc.), and/or other relevant features. Further, in some embodiments, the access control system 100 may automatically and/or seamlessly provide the user access through the passageway by automatically unlocking and/or opening a barrier securing the passageway in response to a determination that the user intends to access (e.g., pass through) the passageway. It should be appreciated that the user intent may be determined according to any suitable techniques and/or mechanisms. Additionally, the access control system 100 may also monitor the passageway and/or environment surrounding the passageway (e.g., interior to and/or exterior to the passageway relative to the barrier) to identify, for example, if and when tailgating has occurred by which an unauthorized entrant has passed through the passageway along with (e.g., subsequent to) a successful access through the passageway by an authorized entrant.

It should be appreciated that the access control device(s) 102, the management system 104, the credential 106, the monitoring device(s) 108, the management server 110, the gateway device 112, the access control panel 114, and/or the mobile device 116 may be embodied as any type of device or collection of devices suitable for performing the functions described herein.

More specifically, in the illustrative embodiment, each of the access control devices 102 may be embodied as any type of device capable of controlling and/or facilitating access through a passageway (e.g., at least in part). For example, in various embodiments, the access control device 102 may be embodied as an electronic lock (e.g., a mortise lock, a cylindrical lock, or a tubular lock), an exit device (e.g., a pushbar or pushpad exit device), a door closer, an auto-operator, a motorized latch/bolt (e.g., for a sliding door), a barrier control device (e.g., battery-powered), or a peripheral controller of a barrier to a passageway. Accordingly, in some embodiments, the access control device 102 may include a lock mechanism configured to be positioned in a locked state in which access to the passageway is denied, or may be positioned in an unlocked state in which access to the passageway is permitted. In some embodiments, the lock mechanism includes a deadbolt, latch bolt, lever, and/or other mechanism adapted to move between the locked and unlocked state and otherwise perform the functions described herein. However, it should be appreciated that the lock mechanism may be embodied as any another mechanism suitable for controlling access through a passageway in other embodiments.

Depending on the particular embodiment, the access control device 102 may include a credential reader or be electrically/communicatively coupled to a credential reader configured to communicative with credentials 106. In some embodiments, the access control device 102 may have an access control database stored thereon for locally performing access control decisions associated with user access. Accordingly, in such embodiments, the access control database may store credential data, biometric data, historical information, PINs, passcodes, and/or other relevant authentication data associated with users. In other embodiments, such data or a portion thereof may be stored in a centralized access control database (e.g., hosted by and/or accessible to the management server 110).

As shown in FIG. 1, the access control device 102 may include a Radio Detection and Ranging (RADAR) system 120 that may be leveraged by the access control system 100 to detect the presence of a person within the vicinity of the controlled passageway, determine the distance of the person relative to the access control device 102 and/or other reference point, determine the speed and/or direction of travel of a person, determine an angle of approach/arrival of the person relative to the access control device 102 and/or another reference point, evaluate gestures and/or other movements of a person within the vicinity of the access control device 102, measure various biometrics of a person within the vicinity of the access control device 102, and/or perform other suitable features related to seamless access control and/or monitoring.

It should be appreciated that the RADAR system 120 may include a transmitter, antenna system, receiver, and/or other components/systems suitable for RADAR-based operation and/or communication. The transmitter of the RADAR system 120 may generate an electromagnetic signal that is emitted via the antenna. If that electromagnetic signal contacts an object (e.g., moving or stationary), the signal is reflected in various directions, which results in a reflected signal being received by the antenna and receiver. The range of the object may be determined based, for example, on time of flight of the signal from the RADAR system 120 to the object and back via the reflected signal. In some embodiments, the relative angle of the signal may also be determined. It should be appreciated that the antenna of the RADAR system 120 may be any antenna(s) suitable for performing the functions described herein. For example, in various embodiments, the antenna(s) may be embodied as a parabolic reflector, antenna array (e.g., planar arrays), and/or phased arrays. In some embodiments, it should be appreciated that the RADAR system 120 may be placed in a sleep mode when not in use and/or have a reduced measurement update rate in order to reduce power consumption of the RADAR system 120. It should be appreciated that the RADAR system 120 may provide reliable and high resolution measurements relatively independent of environmental conditions (e.g., rain, snow, dust, direct sunlight, etc.) while potentially being concealed within an enclosure, wall, or other structure (e.g., for improved security and/or aesthetics of the access control system 100).

As described herein, the RADAR system 120 may be used in conjunction with a wireless credential (e.g., a BLE credential) for seamless access control. For example, in some embodiments, the access control device 102 may detect the presence of the wireless credential (e.g., via BLE communication) and pre-authenticate the user based on that credential. Further, the RADAR system 120 may classify an object in its field of view/propagation as "human." Additionally, in some embodiments, the RADAR system 120 may further detect the direction, speed, proximity, and/or other characteristics of the identified human to determine intent (e.g., user intent). In some embodiments, the access control device 102 may correlate the RADAR system 120 data with signal strength (e.g., via BLE communication) to reduce (e.g., eliminate) errors associated with secure/unsecure side determinations. The access control device 102 may control the secure passageway based on the authentication and intent ascertained by the RADAR system 120 and the wireless credential. Accordingly, in some embodiments, the BLE credential may be evaluated to determine that the credential is valid and within range, and the RADAR system 120 may be used to confirm that the correct person is approaching the access control device 102 before performing the relevant access control action (e.g., lock/unlock).

It should be appreciated that the RADAR system 120 may be further leveraged for various other purposes. For example, in some embodiments, the RADAR system 120 may be utilized for accurate presence detection. In particular, in some embodiments, the RADAR system 120 may monitor a conference room or other room to assess the utilization of that room. The RADAR system 120 may distinguish between humans and other objects within the room including, for example, objects moving due to environmental factors (e.g., plants, drapes, etc. moving due to air flow from the HVAC system or otherwise). In other embodiments, the RADAR system 120 may be leveraged for person monitoring and/or vital sensing. For example, in some embodiments, the RADAR system 120 may detect/determine the presence of a person in a room or a particular location within the room (e.g., within a bed), motion of a person, gestures of a person, respiratory rate of a person, and/or other remotely assessable characteristics of a person. Accordingly, it should be appreciated that the RADAR system 120 may be leveraged for aging-in-place or senior care. Further, in some embodiments, the RADAR system 120 may be used to perform body scanning to determine what objects (if any) a person has on his/her possession. For example, in a weapons-restricted area (e.g., hospital, school, sporting event, concert, government facility, etc.), the RADAR system 120 may detect various weapons in the person's possession. In commercial environments, the RADAR system 120 may detect for theft prevention that an unpaid item is being concealed and carried through an egress passageway.

In some embodiments, the access control device 102 and/or the monitoring device 108 may include a Light Detection and Ranging (LIDAR) system configured to perform one or more of the features of the RADAR system 120 described herein (e.g., in conjunction with or in the alternative to the RADAR system 120). Further, in some embodiments, the access control device 102 and/or the monitoring device 108 may include suitable antennas and communication circuitry to enable ultra-wideband (UWB) communication, which may be used to determine the location (e.g., distance and angle) of other UWB-enabled devices relative to the device 102, 108. Depending on the particular embodiment, the various access control devices 102 and/or the monitor devices 108 may be powered by an independent, untethered, and portable power source (e.g., one or more batteries, battery packs, capacitors, super capacitors, solar cells, and/or other power supplies) and/or powered by an electrical connection to a remote power supply (e.g., line power, Power-over-Ethernet (PoE), etc.).

In some embodiments, one or more of the credentials 106 may be embodied as a passive credential device having a credential identifier (e.g., a unique ID) stored therein and is "passive" in the sense that the credential device is configured to be powered by radio frequency (RF) signals received from a credential reader. In other words, such passive credentials do not have an independent power source but, instead, rely on power that is induced from RF signals transmitted from other devices in the vicinity of the credential. In particular, in some embodiments, one or more of the passive credentials may be embodied as a proximity card, which is configured to communicate over a low frequency carrier of nominally 125 kHz, and/or a smartcard, which is configured to communicate over a high frequency carrier frequency of nominally 13.56 MHz. However, it should be appreciated that, in other embodiments, each of the credentials 106 may be embodied as any type of passive or active credential device capable of performing the functions described herein. For example, in some embodiments, one or more of the credentials 106 may be embodied as a virtual credential (e.g., a Bluetooth transmitted credential) stored on the mobile device 116 and/or other computing device of a particular user.

As described herein, the management system 104 may be configured to manage credentials of the access control system 100. For example, depending on the particular embodiment, the management system 104 may be responsible for ensuring that the access control devices 102 have updated authorized credentials, whitelists, blacklists, device parameters, and/or other suitable data. Additionally, in some embodiments, the management system 104 may receive security data, audit data, raw sensor data, and/or other suitable data from the access control devices 102 for management of the access control system 100. In some embodiments, one or more of the devices of the management system 104 may be embodied as an online server or a cloud-based server. Further, in some embodiments, the management system 104 may communicate with multiple access control devices 102 at a single site (e.g., a particular building) and/or across multiple sites. That is, in such embodiments, the management system 104 may be configured to receive data from access control devices 102 distributed across a single building, multiple buildings on a single campus, or across multiple locations.

It should be appreciated that the management system 104 may include one or more devices depending on the particular embodiment of the access control system 100. For example, as shown in FIG. 1, the management system 104 may include a management server 110, a gateway device 112, an access control panel 114, and/or a mobile device 116 depending on the particular embodiment. The functions of the management system 104 described herein may be performed by one or more of those devices in various embodiments. For example, in some embodiments, the management server 110 may perform all of the functions of the management system 104 described herein. Further, in some embodiments, the gateway device 112 may be communicatively coupled to the access control devices 102 such that the other devices of the management system 104 (e.g., the management server 110, the access control panel 114, and/or the mobile device 116) may communicate with the access control devices 102 via the gateway device 112.

In some embodiments, the access control devices 102 may communicate with the management server 110 over a Wi-Fi connection and/or with the mobile device 116 over a Bluetooth connection. Additionally, the access control devices 102 may communicate with the management server 110 and/or the access control panel 114 via the gateway device 112. As such, in the illustrative embodiment, the access control device 102 may communicate with the gateway device 112 over a Wi-Fi connection and/or a Bluetooth connection, and the gateway device 112 may, in turn, forward the communicated data to the relevant management server 110 and/or access control panel 114. In particular, in some embodiments, the gateway device 112 may communicate with the access control panel 114 over a serial communication link (e.g., using RS-485 standard communication), and the gateway device 112 may communicate with the management server 110 over a Wi-Fi connection, an Ethernet connection, or another wired/wireless communication connection. As such, it should be appreciated that each of the access control devices 102 may communicate with the management server 110 via an online mode with a persistent real-time communication connection or via an offline mode (e.g., periodically or in response to an appropriate condition) depending on the particular embodiment (e.g., depending on whether the particular access control device 102 is offline). As indicated above, in other embodiments, it should be appreciated that the access control devices 102 may communicate with the devices of the management system 104 via one or more other suitable communication protocols.

As described in greater detail below, each of the monitoring devices 108 may be configured to monitor the physical environment of the secured passageway and may be configured to communicate with the management system 104 and/or one or more of the access control devices 102 to exchange information. For example, as shown in FIG. 1, the monitoring devices 108 may include one or more cameras 122, audio I/O devices 124, and/or sensors 126 configured to capture corresponding data. Additionally, in some embodiments, one or more of the monitoring devices 108 may include a RADAR system 120. It should be appreciated that the RADAR system 120 of the monitoring device(s) 108 may be similar to the RADAR system 120 of the access control device(s) 102, and the description of the RADAR system 120 of the access control device(s) 102, therefore, is applicable to the RADAR system 120 of the monitoring device(s) 108, further description of which has been omitted for brevity of the disclosure.

Each of the cameras 122 may be embodied as any type of device capable of capturing one or images discretely or in a stream. For example, the cameras 122 may include one or more two-dimensional (2D) cameras, three-dimensional (3D) cameras, and/or video cameras. It should be appreciated that the cameras 122 may be positioned in any suitable location(s) depending on the particular passageway, barrier(s) securing the passageway, access control device(s) 102, and/or other characteristics of the environment. For example, depending on the particular embodiment, the cameras 122 may be secured to, integrated with, embedded within, and/or otherwise attached to the access control device 102, barrier, and/or nearby wall/surface. In some embodiments, the cameras 122 may be configured to stream video of the environment to another device (e.g., an access control device 102 and/or a device of the management system 104).

Each of the audio I/O devices 124 may be embodied as any type of device capable of receiving audio input and/or emitting audio output. For example, the audio I/O devices 124 may include one or more microphones and/or speakers. It should be appreciated that the audio I/O devices 124 may be positioned in any suitable location(s) depending on the particular passageway, barrier(s) securing the passageway, access control device(s) 102, and/or other characteristics of the environment. For example, depending on the particular embodiment, the audio I/O devices 124 may be secured to, integrated with, embedded within, and/or otherwise attached to the access control device 102, barrier, and/or nearby wall/surface. In some embodiments, audio may be received from the audio I/O devices 124 and communicated to another device and/or transmitted from the other device to the audio I/O devices 124 for emission therefrom. For example, in some embodiments, the audio I/O devices 124 may be configured to generate an audible alarm (e.g., a siren or buzzer) in response to an alarm condition (e.g., a detected tailgating condition).

The sensors 126 are configured to generate sensor data (e.g., by virtue of one or more signals), which may be interpreted by a corresponding processor (e.g., of the access control device(s) 102, the monitoring device(s) 108, and/or the management system 104) to determine one or more characteristics associated with the passageway, barrier, other device(s) of the access control system 100, and/or the environment thereof. By way of example, the sensors 126 may detect various characteristics of the physical environment, electrical characteristics of the access control device(s) 102, electromagnetic characteristics of the access control device(s) 102 or their surroundings, and/or other suitable characteristics. For example, in various embodiments, the sensors 126 may be embodied as, or otherwise include, inertial sensors (e.g., accelerometers, gyroscopes, etc.), environmental sensors (e.g., air pressure sensors, humidity sensors, light sensors, etc.), proximity sensors, optical sensors, electromagnetic sensors (e.g., magnetometers), hall effect sensors, audio sensors (e.g., microphones), temperature sensors, motion sensor, piezoelectric sensors, cameras, antennas, communication circuitry, micro switches, tamper sensors, barrier position sensors, latch sensors, and/or other types of sensors. In particular, in some embodiments, the sensors 126 may include a door position sensor configured to generate sensor data (e.g., by virtue of one or more signals) associated with a door position status, which may be interpreted by the access control device 102, the management system 104, and/or another device of the system 100 to determine whether the door is in a closed position or an open position (and/or a position therebetween), and/or a latchbolt sensor configured to generate sensor data (e.g., by virtue of one or more signals) associated with a latchbolt status, which may be interpreted by the access control device 102, the management system 104, and/or another device of the system 100 to determine whether the latchbolt is in an extended position or a retracted position. It should be appreciated that, in some embodiments, the monitoring devices 108 may include additional and/or alternative sensors other than those described above. Of course, the monitoring devices 108 may also include components and/or devices configured to facilitate the use of the sensors.

In some embodiments, the monitoring devices 108 may include one or more anti-tailgating devices configured to monitor (e.g., via cameras, sensors, counters, and/or other suitable components) the number of persons entering the passageway and the number of persons authorized to enter through the passageway to determine whether an unauthorized person has passed (or attempted to pass) through the passageway, for example, by tailgating behind an authorized entrant. In some embodiments, one or more of the anti-tailgating devices may be embodied as a tailgate-discouraging device (or component(s) thereof) as described in U.S. Provisional Application No. 62/733,964, titled "Systems and Methods for Discouraging Tailgating" and filed on Sep. 20, 2018 (hereinafter "Systems and Methods for Discouraging Tailgating"), the entirety of which is incorporated herein by reference.

Although the monitoring devices 108 are described herein as being separate from the access control device(s) 102, it should be appreciated that one or more of the monitoring devices 108 may be coupled to and/or may form a portion of one or more access control devices 102 in some embodiments.

It should be appreciated that each of the access control devices 102, the management system 104, the monitoring devices 108, the management server 110, the gateway device 112, the access control panel 114, and/or the mobile device 116 may be embodied as one or more computing devices similar to the computing device 200 described below in reference to FIG. 2. For example, one or more of the access control devices 102, the management system 104, the monitoring devices 108, the management server 110, the gateway device 112, the access control panel 114, and the mobile device 116 may include a processing device 202 and a memory 206 having stored thereon operating logic 208 for execution by the processing device 202 for operation of the corresponding device.

It should be further appreciated that, although the management system 104 and the management server 110 are described herein as one or more computing devices outside of a cloud computing environment, in other embodiments, the system 104 and/or server 110 may be embodied as a cloud-based device or collection of devices. Further, in cloud-based embodiments, the system 104 and/or server 110 may be embodied as a "serverless" or server-ambiguous computing solution, for example, that executes a plurality of instructions on-demand, contains logic to execute instructions only when prompted by a particular activity/trigger, and does not consume computing resources when not in use. That is, the system 104 and/or server 110 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system 104 and/or server 110 described herein. For example, when an event occurs (e.g., data is transferred to the system 104 and/or server 110 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of updated access control data is made by a user (e.g., via an appropriate user interface to the system 104 or server 110), the appropriate virtual function(s) may be executed to perform the actions before eliminating the instance of the virtual function(s).

Although only one management system 104, one credential 106, one management server 110, one gateway device 112, one access control panel 114, and one mobile device 116 are shown in the illustrative embodiment of FIG. 1, the system 100 may include multiple management systems 104, credentials 106, management servers 110, gateway devices 112, access control panels 114, and/or mobile devices 116 in other embodiments. For example, as indicated above, the server 110 may be embodied as multiple servers in a cloud computing environment in some embodiments. Further, each user may be associated with one or more separate credentials 106 in some embodiments.

Figure 2:
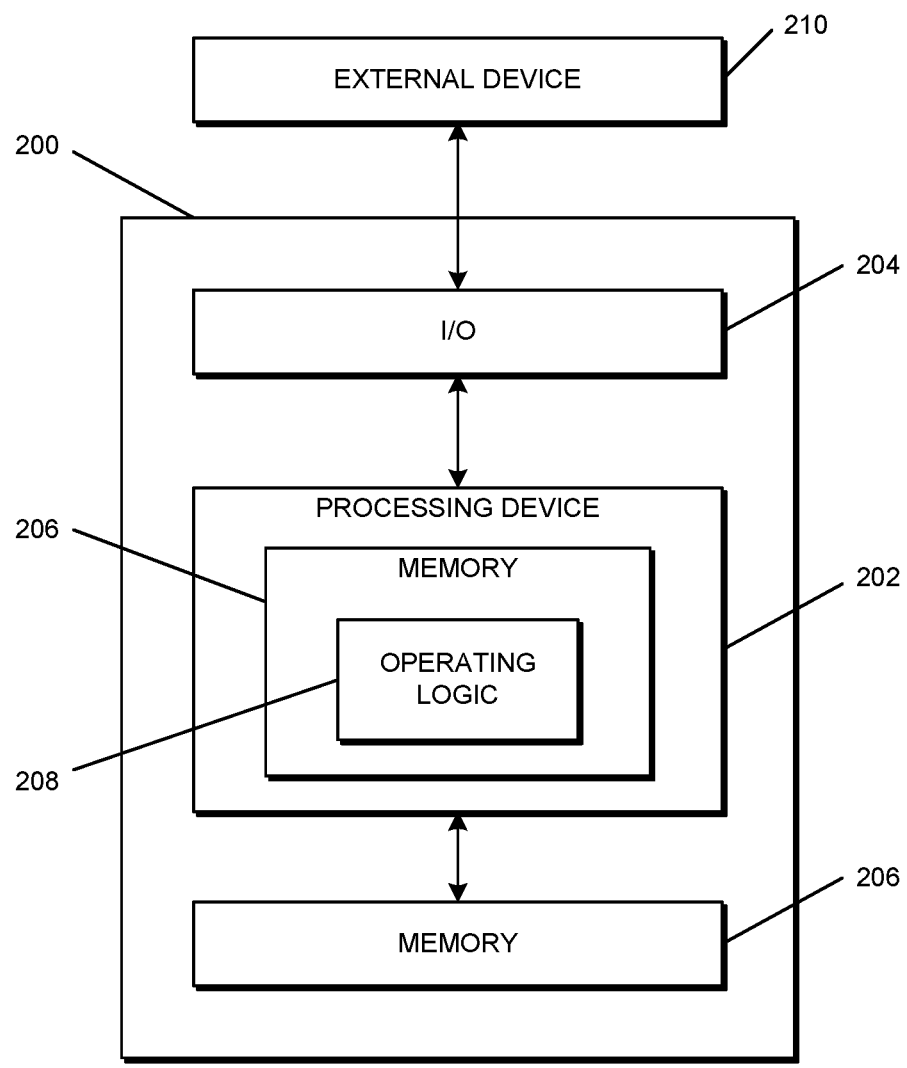
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of an access control device 102, management system 104, monitoring device 108, management server 110, gateway device 112, access control panel 114, and/or mobile device 116 illustrated in FIG. 1. Depending on the particular embodiment, computing device 200 may be embodied as a reader device, access control device, server, desktop computer, laptop computer, tablet computer, notebook, netbook, Ultrabook™, mobile computing device, cellular phone, smartphone, wearable computing device, personal digital assistant, Internet of Things (IoT) device, monitoring device, camera device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the access control device 102, the management system 104, the credential 106, the monitoring device 108, the management server 110, the gateway device 112, the access control panel 114, and/or the mobile device 116. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
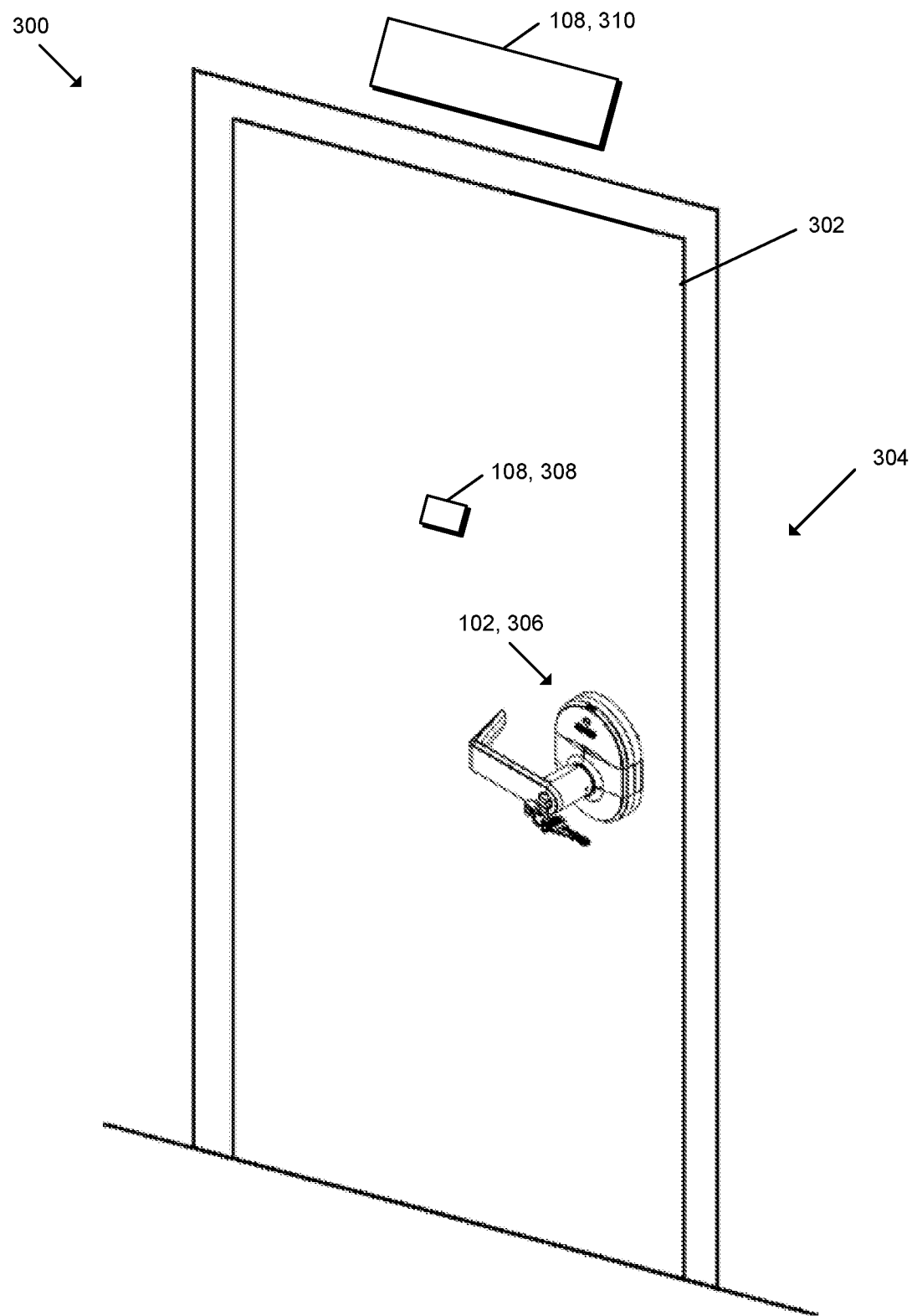
FIG. 3 is a simplified diagram of at least one embodiment of an exterior side of an access-controlled passageway.
Figure 4:
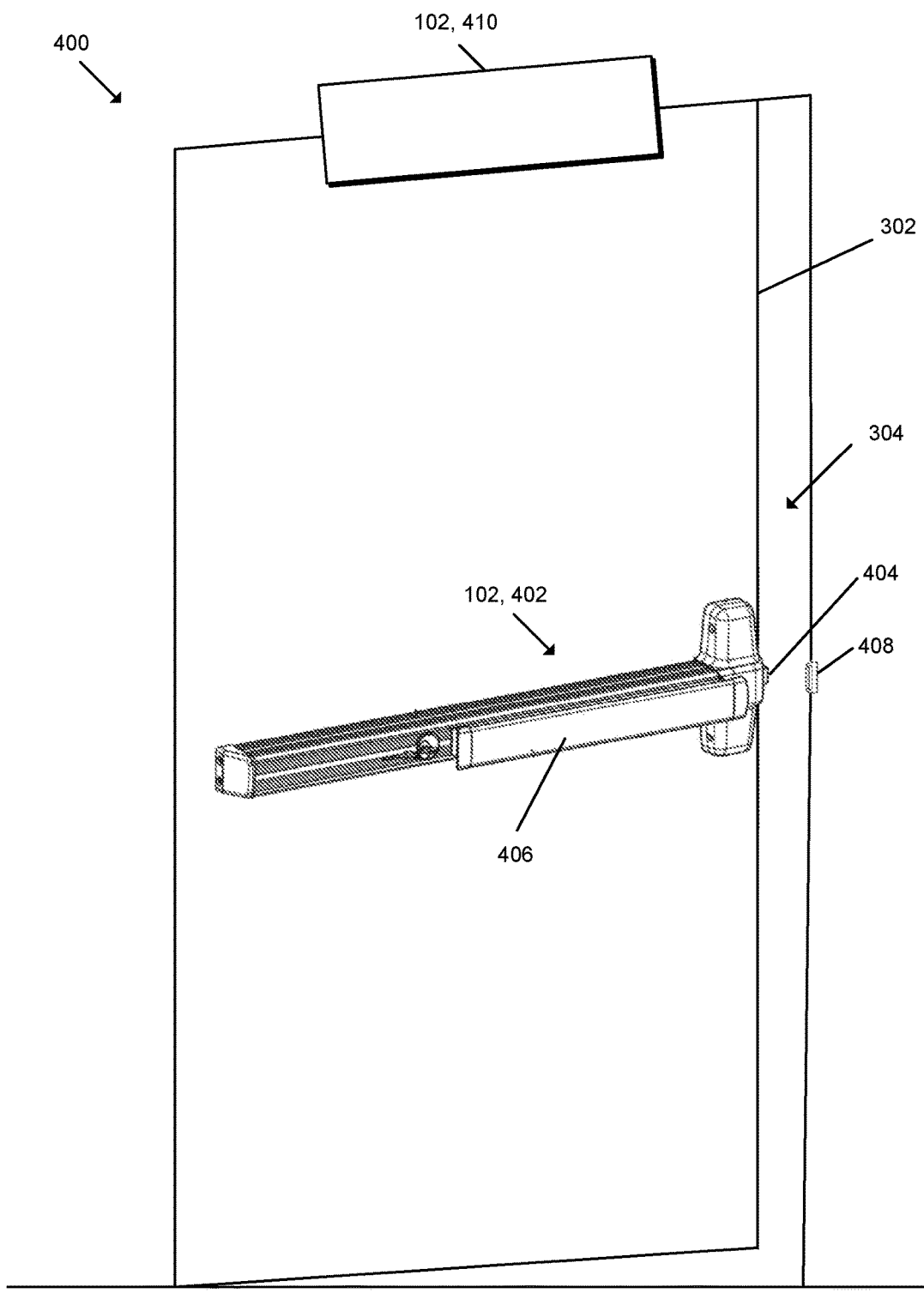
FIG. 4 is a simplified diagram of at least one embodiment of an interior side of an access-controlled passageway.

Referring now to FIGS. 3-4, a moveable barrier 302 selectively prevents passage of users through a passageway 304 formed in a wall. As shown, an exterior side 300 (see FIG. 3) and an interior side 400 (see FIG. 4) are defined relative to the barrier 302 and the passageway 304. In some embodiments, it should be appreciated that the exterior side 300 of the barrier 302 corresponds with an unsecured, or less secured, region and the interior side 400 of the barrier 302 corresponds with a secured, or more secured, region. Although the barrier 302 is depicted as a hinged door in the illustrative embodiment of FIGS. 3-4, it should be appreciated that the barrier 302 may be embodied as an otherwise moveable barrier (e.g., a sliding door) and/or a different type of barrier (e.g., a gate) in other embodiments. Similarly, although the barrier 302 is illustratively depicted as a perimeter door, it should be appreciated that the barrier 302 may be embodied as an interior door (e.g., an office door or conference room door) in other embodiments.

As shown in FIG. 3, an access control device 102 is secured to the exterior side 300 of the barrier 302 and is illustratively depicted as an electronic lockset 306. In the illustrative embodiment, the electronic lockset 306 may include a credential reader configured to read physical and/or virtual credentials 106, for example, via RF, NFC, Wi-Fi, Bluetooth, and/or other communication signals. Further, in the illustrative embodiment, one or more monitoring devices 108 are positioned exterior to the barrier 302. More specifically, the monitoring devices 108 may include one or more barrier-mounted monitoring devices 108, 308 and/or one or more wall-mounted monitoring devices 108, 310. For example, in some embodiments, the wall-mounted monitoring devices 108, 310 may include a camera configured to capture images of user's in the vicinity of the barrier 302 (e.g., images of users attempting to pass through the passageway 304) and/or an anti-tailgating device configured to monitor whether unauthorized tailgating has occurred. Further, in some embodiments, the barrier-mounted monitoring devices 108, 308 may include one or more accelerometers, pressure sensors, and/or other sensors configured to generate sensor data indicative of whether a user has touched the barrier 302 and/or otherwise indicative of the user's intent to access the passageway 304. In some embodiments, the monitoring devices 108 may further include a microphone configured to capture audio of users in the vicinity of the barrier 302 (e.g., audio of users attempting to pass through the passageway 304). As described herein, the images and/or audio of the users may be used as biometric data for multifactor authentication.

As shown in FIG. 4, an access control device 102 is secured to the interior side 400 of the barrier 302 and is illustratively depicted as an exit device 402. In the illustrative embodiment, the exit device 402 includes a latch 404 that is configured to be retracted when a pushbar 406 of the exit device 402 is depressed and/or when the handle of the electronic lockset 306 is rotated. Further, when the barrier 302 is in a closed position and the latch 404 is extended, the latch 404 is configured to engage a strike 408 to secure the barrier 302 in the closed position. Additionally, in some embodiments, the exit device 402 may include a dogging mechanism capable of maintaining the pushbar 406 in a retracted state. Further, in some embodiments, the exit device 402 may be capable of wirelessly communicating with the management system 104 and/or other access control devices 102 to receive communication signals causing the dogging mechanism to be positioned in a dogging state (e.g., to dog the pushbar 406) and/or causing the dogging mechanisms to be positioned in an undogged state (e.g., to release the pushbar 406). For example, in some embodiments, the management system 104 may transmit a command to the exit device 402 to undog the dogging mechanism in response to a campus lockdown. In some embodiments, rather than positioning the dogging mechanism in a dogging state, the dogging mechanism may be configured to be positioned in a "dog on next exit" or "ready to dog" state such that the pushbar 406 is dogged when the pushbar 406 is next manually depressed by a user. Also depicted in FIG. 4, another access control device 102 such as an automated door closer and/or auto-operator 410 may be secured to the interior side 400 of the barrier 302 and configured to control movement of the barrier 302 relative to the passageway 304. In some embodiments, the auto-operator 410 may be battery-powered or otherwise self-powered (i.e., rather than being line-powered).

As indicated above, in some embodiments, the moveable barrier 302 secures an interior passageway 304. For example, the barrier 302 may be embodied as a sliding door (e.g., a sliding glass door) that is moveable by an auto-operator and/or other barrier control device (e.g., having a motor/actuator and communication circuitry). Further, in some embodiments, the barrier 302 may be secured in a closed position via a latch mechanism (e.g., a motorized latch). It should be further appreciated that although FIGS. 3-4 depict various monitoring devices 108 as barrier-mounted monitoring devices 308 and/or wall-mounted monitoring devices 310, each of the monitoring devices 108 described herein may be mounted, secured, and/or positioned in any manner suitable for performing the functions described herein.

Figure 5:
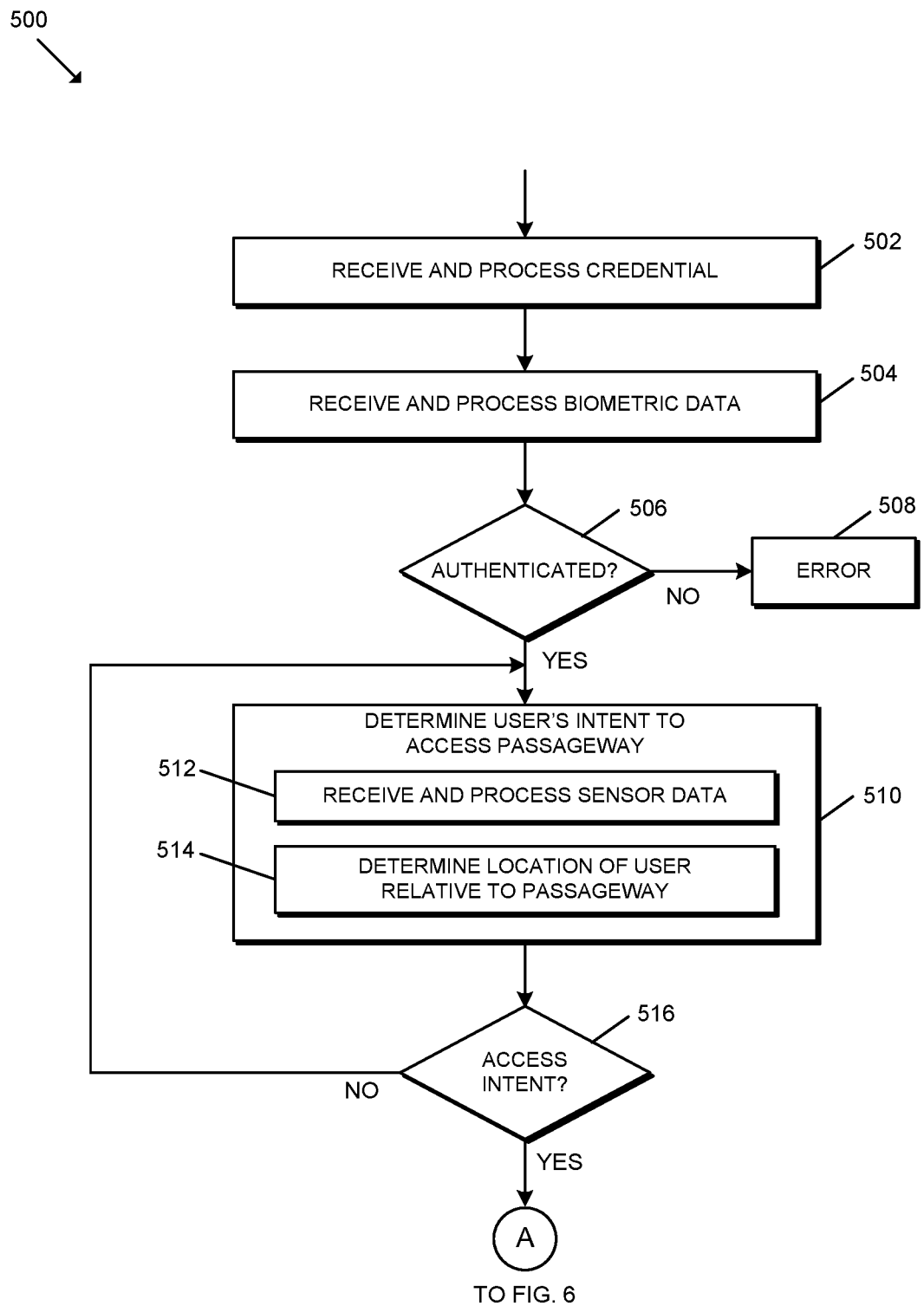
FIGS. 5-6 are a simplified flow diagram of at least one embodiment of a method for seamless access control.
Figure 6:
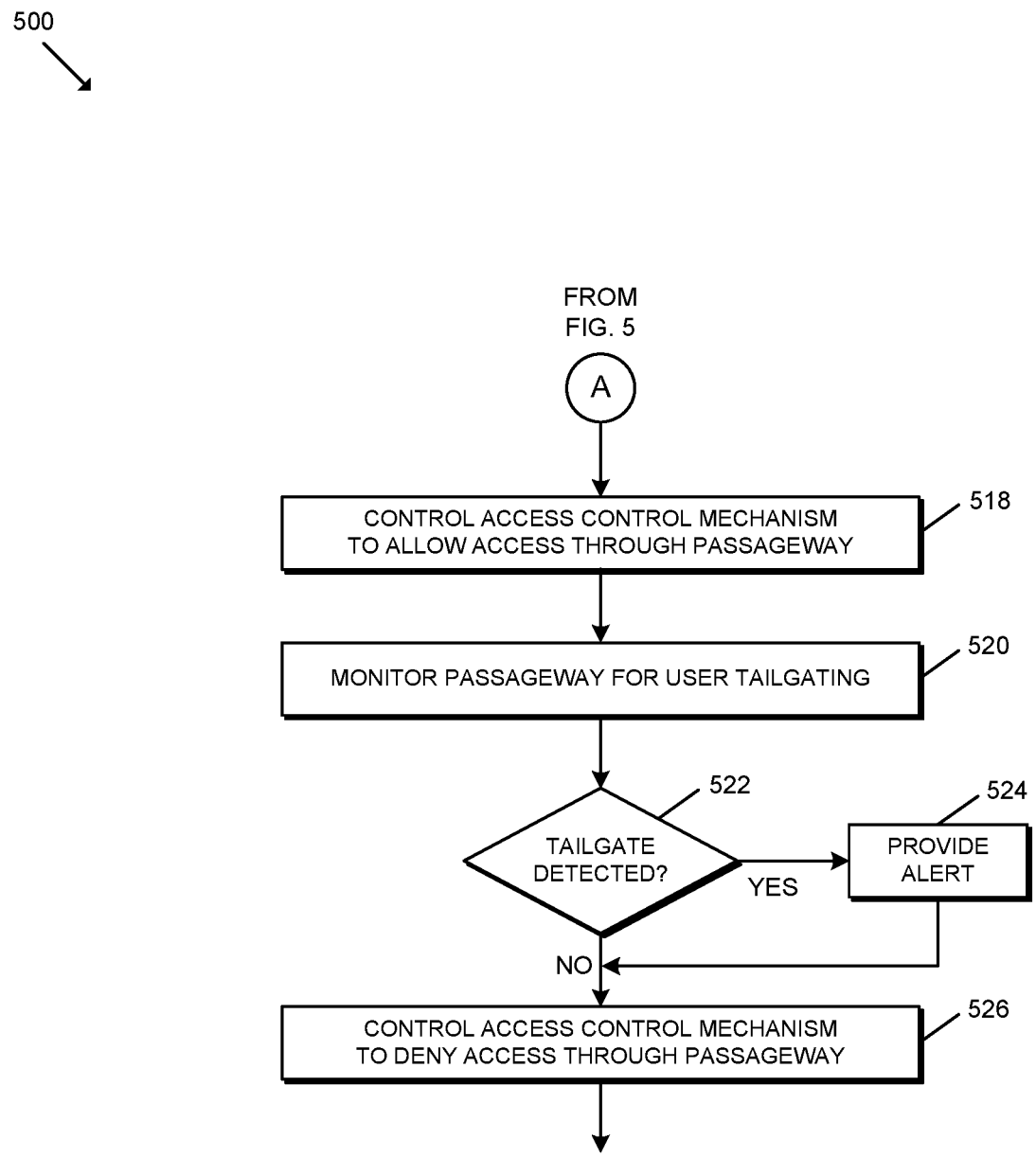

Referring now to FIGS. 5-6, in use, the access control system 100 may execute a method 500 for seamless access control. It should be appreciated that the particular blocks of the method 500 are illustrated by way of example, and such blocks may be combined or divided, added or removed, and/or reordered in whole or in part depending on the particular embodiment, unless stated to the contrary. The illustrative method 500 begins with block 502 of FIG. 5 in which the access control system 100 receives and processes a user credential received by an access control device 102. As indicated above, in some embodiments, the credential may be embodied as a passive credential and form a portion of a portion of a card, tag, fob, or other physical credential device 106, whereas in other embodiments the credential (e.g., a BLE credential) may be stored on a mobile device 116 of the user and/or other active computing device. In either case, the access control device 102 may receive the credential data via a suitable wireless communication protocol and read the credential data to determine whether the credential authorizes the corresponding user to access the passageway secured by the barrier and access control device(s) 102. Depending on the particular embodiment, it should be appreciated that the credential data may be processed locally at the access control device 102 that received the credential data, locally at another access control device 102 in the vicinity of the corresponding barrier (e.g., at a peripheral controller communicatively coupled to the access control device 102), and/or remotely by the management system 104 (e.g., at a host server or management server 110).

As described above, in the illustrative embodiment, the user credential may serve as only one aspect of a multifactor authentication scheme employed by the access control system 100. For example, as described above, the access control system 100 may perform authentication based on one or more features in the user's possession (e.g., a physical and/or virtual credential), based on one or more features of the user (e.g., biometrics), based on one or more features known to the user (e.g., historical information, PIN, passcode, etc.), and/or other relevant features. As such, in block 504, the access control system 100 may receive and process biometric data of the user. It should be appreciated that the input device that receives the biometric data, the device that stores the reference biometric data for authentication, and/or the device that processes the biometric data may vary depending on the particular implementation. In some embodiments, one or more monitoring devices 108 (e.g., cameras, microphones, etc.) may be configured to capture biometric data associated with one or more biometrics of the user, whereas in other embodiment the user's mobile device 116 may be configured to capture and/or process the biometric data (e.g., using a Fast Identity Online (FIDO) protocol). It should be further appreciated that the particular biometrics captured may vary depending on the particular embodiment. For example, the access control system 100 may employ facial recognition, voice recognition, gait analysis, iris recognition, retina recognition, fingerprint recognition, signature analysis, olfactory biometrics, and/or other suitable biometrics in various embodiments depending on the particular implementation and/or circumstances.

In some embodiments, the monitoring devices 108 may include one or more microphones or other audio input devices positioned in the vicinity of the secured passageway. As indicated above, the audio input devices may be standalone devices (e.g., secured to the wall, barrier, ceiling, or elsewhere) and/or the audio input devices may be secured to or form a portion of an access control device 102 or other device of the access control system 100. In such embodiments, the monitoring devices 108 may capture audio in the vicinity of the secured passageway, identify a person's voice from the captured audio, determine an identity of that person (e.g., based on a voiceprint and/or characteristics of the person's voice), and/or confirm that the captured audio is not a recording of the person. It should be appreciated that the audio may be analyzed using any techniques and technologies suitable for distinguishing the voices of individual persons and otherwise performing the functions described herein.

In some embodiments, the monitoring devices 108 may include one or more cameras or other image capturing devices positioned in the vicinity of the secured passageway. As indicated above, the cameras may be standalone devices (e.g., secured to the wall, barrier, ceiling, or elsewhere) and/or may be secured to or form a portion of an access control device 102 or other device of the access control system 100. In such embodiments, the monitoring devices 108 may capture images of persons in the vicinity of the secured passageway and determine an identity of one or more (e.g., each) person near the passageway or moving toward the passageway (or determine that the person's identity is unknown). For example, in some embodiments, the access control system 100 may employ one or more machine learning and/or deep learning algorithms to match or identify a person based on a gallery of images of known individuals (e.g., employees and guests at a corporate campus).

Although various functions are described herein as being performed by the monitoring devices 108 (e.g., related to biometric processing), it should be appreciated that one or more of those functions may be performed by an access control device 102 and/or other device of the access control system 100 in other embodiments.

As indicated above, in some embodiments, the biometric data may be captured and processed by a FIDO-compliant device that implements the FIDO protocol or other suitable decentralized authentication protocol (e.g., using the user's mobile device 116). In such embodiments, the biometric data (e.g., image, video, audio, etc.) may be captured by the user's mobile device 116 and analyzed thereon such that it is unnecessary to share biometric data with the management system 104, a centralized server, and/or other devices of the access control system 100. Instead, after receiving and processing the biometric data, the mobile device 116 may transmit instructions and/or a result of the analysis to the corresponding access control device 102 and/or other devices in the access control system 100.

It should be appreciated that successful authentication is indicative of the user's authorization to access the passageway controlled by the access control system 100. If the access control system 100 determines in block 506 that the authentication was not successful (e.g., based on an improper credential and/or biometric), the method 500 advances to block 508 in which the access control system 100 handles the error using any suitable technique or mechanism. For example, in some embodiments, the access control system 100 may generate an audit, alert, and/or alarm related to the unsuccessful authentication.

However, if the access control system 100 determines in block 506 that the authentication was successful, the method 500 advances to block 510 in which the access control system 100 may receive and process sensor data, RADAR data, and/or other data, for example, associated with determining a user's intent to access the passageway. Although successful authentication is described in the method 500 of FIGS. 5-6 as including both successful authentication of the credential and successful authentication of the user's biometrics, it should be appreciated that some embodiments may omit one or more of these features. For example, in some embodiments, a user may be authorized to access the secured passageway by virtue of successful authentication of the user's credential without successful authentication (or even consideration) of the user's biometrics. In other embodiments, however, a user's biometrics may serve as that user's credentials such that a physical and/or virtual credential is not required to be validated in order to ascertain the user's authorization to access the passageway. Further, as indicated above, in some embodiments, the user's biometrics may be evaluated without the user's express interaction with any input device (e.g., facial recognition, etc.).

As indicated above, if the access control system 100 determines that the authentication is successful, the method 500 advances to block 510 in which the access control system 100 determines (e.g., by inference) whether the user intends to access the passageway. In doing so, the access control system 100 may receive and process sensor data in block 512 and/or determine the location of the user relative to the passageway, access control device 102, monitoring device 108, and/or other reference point in block 514. For example, in some embodiments, the barrier may include a pressure sensor, inertial sensor (e.g., accelerometer), and/or other suitable sensor to detect when someone touches the barrier, which may be indicative of intent and trigger the access control device 102 to automatically open the barrier. However, it should be appreciated that the access control system 100 may otherwise ascertain the user's intent to access the passageway in other embodiments. For example, depending on the particular embodiment, the user intent may be conveyed without user interaction, with user interaction but without removing the user's mobile device 116 from safekeeping (e.g., without removing the mobile device 116 from the user's pocket, handbag, briefcase, etc.), and/or may involve both user interaction and removal of the mobile device 116 from safekeeping. Further, it should be appreciated that the user intent may be determined in a different sequence in the method 500 and/or in conjunction with the performance of other blocks of the method 500.

As indicated above, in various embodiments, the user intent may be conveyed without the user interaction. For example, in some embodiments, the access control system 100 may leverage the RADAR system 120 of the access control device 102 and/or monitoring device 108 to detect the presence of a person within the vicinity of the controlled passageway, determine the distance of the person relative to the access control device 102 and/or other reference point, determine the speed and/or direction of travel of the person, determine an angle of approach/arrival of the person relative to the access control device 102 and/or another reference point, evaluate gestures and/or other movements of the person within the vicinity of the access control device 102, and/or perform other suitable features related to seamless access control and/or monitoring. In other embodiments, the access control system 100 may engage in triangulation and/or leverage GPS circuitry to determine the location of the user's mobile device 116 relative to the passageway/barrier. In various embodiments, the mobile device 116 may transmit the credential (or alternatively, the access control device 102 may only process the received credential or otherwise interpret the user's actions as intent to access the passageway) when the mobile device 116 is moving toward the access control device 102 and on the proper side of the access control device 102 (e.g., corresponding with an exterior side of the door). In another embodiment, the user may convey an intent to access by walking up to the barrier (and therefore the corresponding access control device 102) and stopping instead of walking by. It should be appreciated that the mobile device 116, the access control device 102, and/or the monitoring device 108 may leverage received signal strength (e.g., signal strength indication (RSSI) values) or time of flight data to determine the distance of the mobile device 116 relative to the access control device 102 in some embodiments. Additionally, in some embodiments, the access control device 102 and/or the monitoring device 108 may calculate the angle of arrival (AoA) of incoming signals from the mobile device 116. Further, in some embodiments, the mobile device 116 may automatically transmit the credential to the access control device 102 when the mobile device 116 is within a predetermined distance of the access control device 102 or other reference device/component (e.g., the door) such that a lock mechanism may be automatically unlocked and/or the barrier may be automatically opened.

As indicated above, in other embodiments, the user intent may be conveyed with user interaction but without removing the mobile device 116 from safekeeping. For example, in some embodiments, the user may convey the intent by tapping the user's mobile device 116. That is, when the mobile device 116 is within a close proximity to the access control device 102, a tap on the mobile device 116 may inform the mobile application of the mobile device 116 to transmit the credential to the access control device 102. It should be appreciated that the mobile device 116 may include and leverage an accelerometer and/or other inertial sensor(s) to perform such functions. In other embodiments, the mobile device 116 may be embodied as, or otherwise include, a wearable device, and an indication appears on a display of the wearable device when the user is within range of an access control device 102. A user's tap of the wearable device may be indicative of an intent to access the passageway secured by the access control device 102. In some embodiments, the mobile device 116 may sense the tap via an inertial sensor, capacitive sensor, pressure sensor, and/or other suitable sensor. In another embodiment, the user may give a gesture (e.g., with the user's hand) indicating that the barrier (e.g., a sliding glass office door or sliding glass conference room door) should be opened for the user.

In yet other embodiments, the user intent may involve both user interaction and removal of the mobile device 116 from safekeeping as indicated above. For example, in some embodiments, near field communication (NFC) circuitry of the mobile device 116 may be used as an intent option to transmit a credential (e.g., by tapping the mobile device 116 to the access control device 102). Further, in some embodiments, the mobile device 116 may utilize a voice recognition system (e.g., via the mobile application, a system application, and/or another application) to determine the user's intent to transmit the credential to an access control device 102. That is, the user may give an audible command to the mobile device 116 to do so.

If the access control system 100 determines in block 516 that the user intends to access the passageway, the method 500 advances to block 518 of FIG. 6 in which the access control system 100 or, more specifically, an access control device 102 controls an access control mechanism (e.g., a lock mechanism, a motor, and/or other components) to allow access through the passageway. As indicated above, the access control device 102 automatically unlocks the barrier and/or automatically opens the barrier depending on the particular embodiment. In other embodiments, instead of defaulting to a "locked" status, the access control device 102 may default to an "unlocked" status and, in conjunction with monitoring of persons within the vicinity of the access control device 102 (e.g., including via the RADAR system 120 and wireless credential processing), the access control device 102 may change to a "locked" status when an unauthorized person is approaching the controlled passageway in a manner determined to be indicative of an intent to access. As such, in some embodiments, the access control system 100 may reverse the traditional locked/unlocked security paradigm.

In block 520, the access control system 100 monitors the passageway for user tailgating. That is, as described above, the access control system 100 may monitor the passageway and/or environment surrounding the passageway (e.g., interior to and/or exterior to the passageway relative to the barrier) to identify if and when tailgating has occurred by which an unauthorized entrant has passed through the passageway following a successful access through the passageway by an authorized entrant. In some embodiments, the access control system 100 may leverage one or more monitoring devices (e.g., cameras, sensors, counters, RADAR, and/or other suitable components) to monitor the number of persons entering the passageway and the number of persons authorized to enter through the passageway to determine whether an unauthorized person has passed (or attempted to pass) through the passageway, for example, by tailgating behind an authorized entrant. In particular, in some embodiments, the access control system 100 may employ one or more of the tailgate-discouraging devices and/or tailgating identification techniques described in reference to Systems and Methods for Discouraging Tailgating, cited above.

It should be appreciated that the monitoring devices 108 used to identify that a person is in view rather than an object may leverage artificial intelligence, machine learning, deep learning, computer vision, and/or other suitable techniques, algorithms, and/or mechanisms. Further, in some embodiments, the monitoring devices 108 may "count" and/or "track" users passing through a passageway and/or within particular regions of a building using low resolution cameras and/or analytical techniques that allow for the obfuscation of the identity of the users themselves. For example, in some embodiments, the monitoring devices 108 may include cameras or sensors that capture a depth stream/channel, which may be used in conjunction with computer vision techniques and deep learning to anonymously count persons. In some embodiments, the monitoring devices 108 may determine the number of persons in a particular space/region (e.g., sampled at various intervals) and/or detect the occurrence of an event and corresponding characteristics (e.g., entry/exit through a passageway including a timestamp and direction).

If the access control system 100 determines that a tailgate has been detected in block 522, the access control system 100 may provide an audit, alert, and/or alarm identifying the detected tailgating condition in block 524. For example, in some embodiments, an audible/visual alarm may be emitted from an input/output device in the vicinity of the tailgated passageway.

In block 526, the access control system 100 or, more specifically, an access control device 102 controls an access control mechanism (e.g., a lock mechanism, a motor, and/or other components) to deny access through the passageway. It should be appreciated that the access control device 102 may lock the access control mechanism and/or automatically close the barrier depending on the particular embodiment.

Although the blocks 502-526 are described in a relatively serial manner, it should be appreciated that various blocks of the method 500 may be performed in parallel in some embodiments.

In some embodiments, the access control system 100 may leverage one or more machine learning and/or artificial intelligence techniques to perform one or more of the various functions described herein. In embodiments leveraging machine learning and/or artificial intelligence, it should be appreciated that the access control device 102, the monitoring device 108, the management system 104, and/or the other device utilizing those techniques may utilize any inputs, machine learning models, and/or machine learning algorithms suitable for performing the functions described herein. For example, in some embodiments, the access control device 102, the monitoring device 108, the management system 104, and/or the other relevant device(s) of the access control system 100 may utilize one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, rule-based algorithms, ensemble algorithms, artificial intelligence, and/or other suitable machine learning algorithms, artificial intelligence algorithms, techniques, and/or mechanisms.

According to an embodiment, a method for seamless access control may include determining whether a user is authorized to access a passageway controlled by an access control device based on credential data received from a mobile device of the user, determining, by a RADAR system, a location of the user relative to the passageway, determining whether the user intends to access the passageway based on the determined location of the user relative to the passageway, and controlling, by the access control device, a lock mechanism to allow the user access to the passageway in response to determining that the user is authorized to access the passageway and the user intends to access the passageway.

In some embodiments, determining whether the user is authorized to access the passageway may include capturing, by the mobile device, biometric data of the user, analyzing, by the mobile device, the captured biometric data to determine an identity of the user, and determining whether the user is authorized to access the passageway controlled by the access control device based on the credential data received from the mobile device of the user and the biometric data of the user.

In some embodiments, determining whether the user is authorized to access the passageway may include executing a Fast Identity Online (FIDO) protocol by the mobile device.

In some embodiments, the access control device may be or include at least one of an electronic lock, an exit device, a door closer, an auto-operator, or a motorized latch.

In some embodiments, the access control device may be battery-powered.

In some embodiments, controlling the lock mechanism to allow the user access to the passageway may include moving a barrier from a closed position to an open position.

In some embodiments, the barrier may be or include a sliding door.

In some embodiments, the method may further include monitoring, by at least one monitoring device, the passageway to detect passage of an unauthorized person through the passageway in response to controlling the lock mechanism allowing the authorized user to access the passageway.

In some embodiments, monitoring the passageway may include monitoring the passageway to detect an occurrence of tailgating of an unauthorized user through the passageway with an authorized user.

According to another embodiment, a system for seamless access control may include a user mobile device, a barrier, an access control device, and a monitoring device. The access control device may be coupled to the barrier and may be configured to receive credential data from the user mobile device, determine whether a user is authorized to access a passageway secured by the barrier based on multifactor authentication of the user, wherein the multifactor authentication involves verification of the credential data received from the user mobile device and verification of biometric data of the user, determine whether the user intends to access the passageway based on an analysis of sensor data, and allow the user access to the passageway in response to a determination that the user is authorized to access the passageway and the user intends to access the passageway. The monitoring device may be configured to monitor the passageway to detect passage of an unauthorized person through the passageway in response to allowing the authorized user to access the passageway.

In some embodiments, the user mobile device may be configured to capture the biometric data of the user, analyze the captured biometric data to determine an identity of the user, and transmit an instruction to the access control device based on the analysis of the captured biometric data.

In some embodiments, the user mobile device may be a Fast Identity Online (FIDO) compliant device and may be configured to execute a FIDO protocol to transmit the instruction to the access control device.

In some embodiments, the access control device may be one of an exit device, a door closer, or an auto-operator.

In some embodiments, the access control device may be a battery-powered barrier controller.

In some embodiments, the access control device may be configured to move the barrier from a closed position to an open position to allow the user access to the passageway.

In some embodiments, the monitoring device may include a camera configured to capture images of users in a vicinity of the passageway and at least one counter configured to track a number of persons that enter the passageway and a number of authorized credentials that are presented to the access control device.

In some embodiments, the system may further include a RADAR system configured to determine a location of the user relative to the passageway, and the access control device may be configured to determine that the user intends to access the passageway based on the determined location of the user relative to the passageway.

According to yet another embodiment, a system may include at least one processor and at least one memory comprising a plurality of instructions stored thereon that, in response to execution by the at least one processor, causes the system to determine whether a user is authorized to access a passageway controlled by an access control device based on credential data received from a mobile device of the user and biometric data of the user, determine whether the user intends to access the passageway based on an analysis of sensor data, control a lock mechanism of an access control device to allow the user access to the passageway in response to a determination that the user is authorized to access the passageway and the user intends to access the passageway, and monitor the passageway to detect passage of an unauthorized person through the passageway in response to control of the lock mechanism to allow the authorized user to access the passageway.

In some embodiments, to determine whether the user is authorized to access the passageway may include to analyze, by the mobile device, the biometric data of the user and analyze, by the mobile device, the captured biometric data to determine an identity of the user.

In some embodiments, to determine whether the user is authorized to access the passageway may include to execute a Fast Identity Online (FIDO) protocol by the mobile device.

According to another embodiment, a method may include determining whether a user is authorized to access a passageway controlled by an access control device based on credential data received from a mobile device of the user and biometric data of the user, determining whether the user intends to access the passageway based on an analysis of sensor data, controlling, by the access control device, a lock mechanism to allow the user access to the passageway in response to determining that the user is authorized to access the passageway and the user intends to access the passageway, and monitoring, by at least one monitoring device, the passageway to detect passage of an authorized person through the passageway in response to controlling the lock mechanism allowing the authorized user to access the passageway.

What is claimed is:

1. A method for seamless access control, the method comprising:
   determining, by an access control device, whether a user is authorized to access a passageway controlled by the access control device based on credential data received from a mobile device of the user over a Bluetooth communication connection established between the mobile device and the access control device;
   determining, by a Light Detection and Ranging (LIDAR) system, a location of the user relative to the passageway;
   determining whether the user intends to access the passageway based on the determined location of the user relative to the passageway; and controlling, by the access control device, a lock mechanism to allow the user access to the passageway in response to determining that the user is authorized to access the passageway and the user intends to access the passageway.

2. The method of claim 1, wherein determining whether the user is authorized to access the passageway comprises:
capturing, by the mobile device, biometric data of the user;
analyzing, by the mobile device, the captured biometric data to determine an identity of the user; and
determining whether the user is authorized to access the passageway controlled by the access control device based on the credential data received from the mobile device of the user and the biometric data of the user.

3. The method of claim 2, wherein determining whether the user is authorized to access the passageway comprises executing a Fast Identity Online (FIDO) protocol by the mobile device.

4. The method of claim 1, wherein the access control device comprises at least one of an electronic lock, an exit device, a door closer, an auto-operator, or a motorized latch.

5. The method of claim 1, further comprising monitoring, by at least one monitoring device, the passageway to detect passage of an unauthorized person through the passageway in response to controlling the lock mechanism allowing the authorized user to access the passageway.

6. The method of claim 5, wherein monitoring the passageway comprises monitoring the passageway to detect an occurrence of tailgating of an unauthorized user through the passageway with an authorized user.

7. The method of claim 1, further comprising monitoring, by at least one monitoring device, the passageway to detect and identify persons approaching the passageway by leveraging artificial intelligence.

8. A system for seamless access control, the system comprising:
a user mobile device;
a barrier;
an access control device coupled to the barrier and configured to (i) receive credential data from the user mobile device, (ii) determine whether a user is authorized to access a passageway secured by the barrier based on multifactor authentication of the user, wherein the multifactor authentication involves verification of the credential data received from the user mobile device and verification of biometric data of the user, (iii) determine whether the user intends to access the passageway based on an analysis of sensor data, and (iv) allow the user access to the passageway in response to a determination that the user is authorized to access the passageway and the user intends to access the passageway; and
a monitoring device configured to monitor the passageway to detect passage of an unauthorized person through the passageway in response to allowing the authorized user to access the passageway.

9. The system of claim 8, wherein the user mobile device is configured to (i) capture the biometric data of the user, (ii) analyze the captured biometric data to determine an identity of the user, and (iii) transmit an instruction to the access control device based on the analysis of the captured biometric data.

10. The system of claim 9, wherein the user mobile device is a Fast Identity Online (FIDO) compliant device and is configured to execute a FIDO protocol to transmit the instruction to the access control device.

11. The system of claim 8, wherein the access control device is configured to move the barrier from a closed position to an open position to allow the user access to the passageway.

12. The system of claim 8, wherein the monitoring device comprises a camera configured to capture images of users in a vicinity of the passageway and at least one counter configured to track a number of persons that enter the passageway and a number of authorized credentials that are presented to the access control device.

13. The system of claim 8, further comprising a RADAR system configured to determine a location of the user relative to the passageway; and
wherein the access control device is configured to determine that the user intends to access the passageway based on the determined location of the user relative to the passageway.

14. The system of claim 8, further comprising a Light Detection and Ranging (LIDAR) system configured to determine a location of the user relative to the passageway; and
wherein the access control device is configured to determine that the user intends to access the passageway based on the determined location of the user relative to the passageway.

15. The system of claim 8, further comprising an ultra-wideband (UWB) communication circuitry configured to determine a location of the user relative to the passageway; and
wherein the access control device is configured to determine that the user intends to access the passageway based on the determined location of the user relative to the passageway.

16. The system of claim 8, further comprising a RADAR system configured to monitor a room secured by the barrier; and
wherein the RADAR system is configured to detect a presence and location of a person within the room secured by the barrier.

17. The system of claim 16, wherein the RADAR system is configured to sense a vital characteristic of the person within the room secured by the barrier.

18. The system of claim 16, wherein the RADAR system is configured to sense a respiratory rate of the person within the room secured by the barrier.

19. The system of claim 16, wherein the RADAR system is configured to perform body scanning of the person within the room secured by the barrier to identify objects in the person's possession.

20. The system of claim 8, wherein the monitoring device is configured to leverage artificial intelligence to detect and identify persons approaching the passageway.

* * * * *